Nov. 20, 1951     D. J. SMITH     2,575,600
INVERTER
Filed Jan. 20, 1950
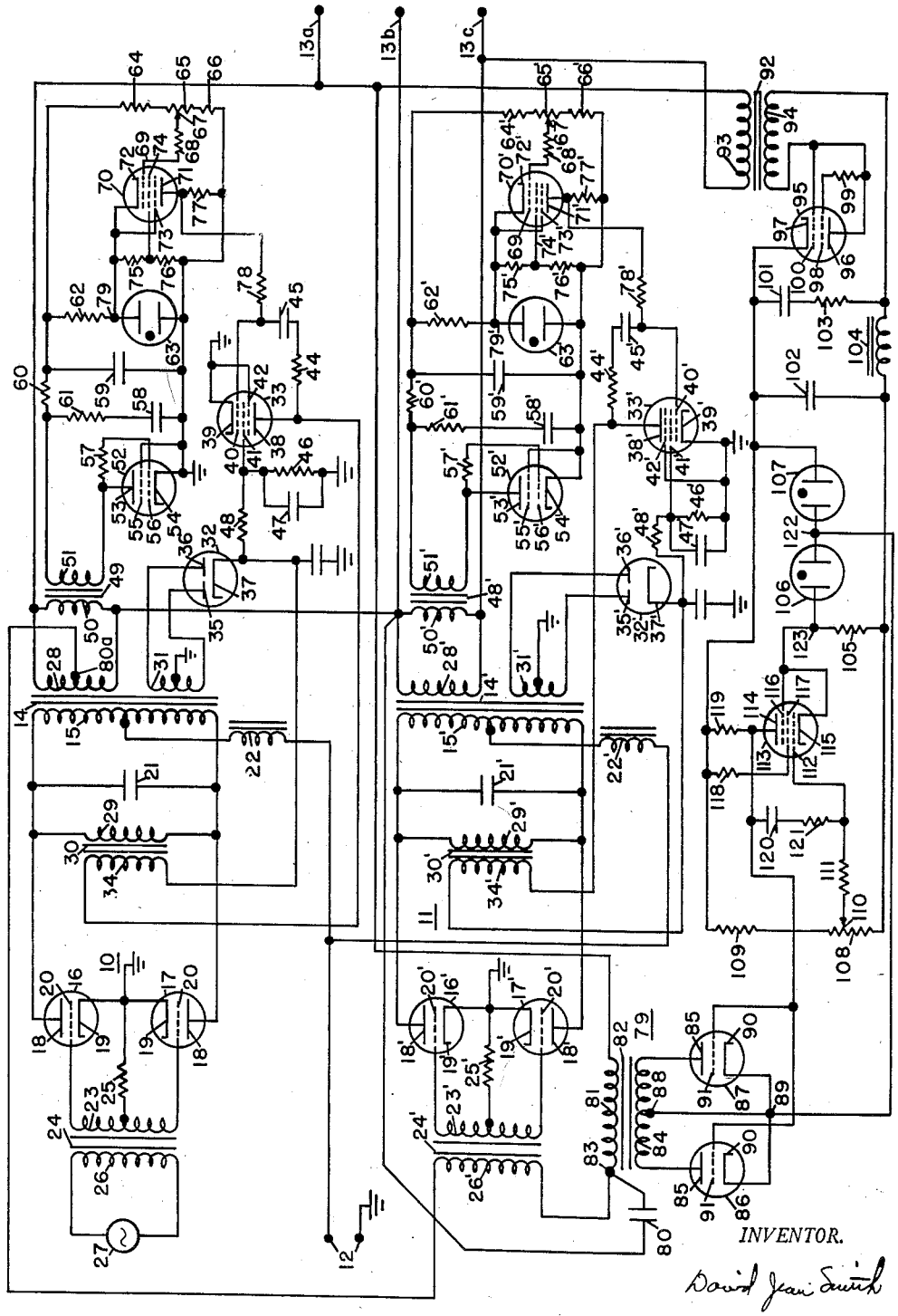
INVENTOR.
David Jean Smith Patented Nov. 20, 1951

2,575,600

UNITED STATES PATENT OFFICE 2,575,600

INVERTER

David Jean Smith, Dallas, Tex., assignor to Varo Mfg. Co., Inc., Garland, Tex., a corporation of Texas Application January 20, 1950, Serial No. 139,737

17 Claims. (Cl. 321—27)

My invention relates to electric translating apparatus and more particularly to apparatus for transmitting energy from a direct current circuit to a polyphase alternating current circuit.

In many applications, it is necessary to transmit energy from a direct current circuit to a polyphase alternating current circuit and to maintain very close regulation of the magnitude and phase position of the voltage across each phase of the polyphase alternating current circuit.

Accordingly, it is an object of my invention to provide a new and improved electric translating apparatus.

It is another object of my invention to provide a new and improved electric translating apparatus for transmitting energy from a direct current circuit to a polyphase alternating current circuit.

It is another object of my invention to provide a new and improved electric translating apparatus for transmitting energy from a direct current circuit to a three phase alternating current circuit.

It is another object of my invention to provide a new and improved apparatus for changing direct current into a plurality of single phase alternating currents and controlling the relative phase positions of the single phase alternating currents to supply a voltage regulated and phase balanced polyphase alternating current.

It is still another object of my invention to provide a new and improved apparatus for changing direct current into two single phase alternating currents and controlling the relative phase positions of the single phase alternating positions to supply a voltage regulated and phase balanced three phase alternating current.

Briefly stated, in the illustrated embodiment of my invention I provide a new and improved electric translating apparatus which comprises a pair of inverters of the well known parallel type each supplying a single phase alternating current output. The frequency of oscillation of the first inverter is determined by the frequency of oscillation of an alternating current supplied from an auxiliary source while the frequency of oscillation of the second inverter is determined by the frequency of oscillation of the first inverter. The output circuits of the two inverters are connected in open delta, i. e., one side of the output circuit of the first inverter is connected to one side of the output circuit of the other inverter. The two single phase output circuits then constitute a three phase alternating current circuit, the third phase appearing across the sides of the output circuits of the inverters which are not directly connected together. In order to maintain constant magnitude and phase position of the voltage across each phase of the three phase circuit, a voltage regulating circuit is associated with each inverter and a phase shifting circuit is employed to shift the phase position of the alternating current produced by the second inverter with respect to the phase of the alternating current produced by the first inverter to maintain proper phase relationship between the voltages appearing across each phase of the three phase alternating current circuit.

For a better understanding of my invention, reference may be had to the following description taken in connection with the accompanying drawing and its scope will be pointed out in the appended claims. The single figure of the accompanying drawing illustrates a preferred embodiment of my invention for translating direct current into polyphase alternating current.

Referring now to the single figure of the drawing, I provide a pair of inverters 10 and 11 of the well known parallel type which transmit energy between direct current circuit 12 and three phase alternating current circuit 13a, 13b and 13c. Inverter 10 comprises a transformer 14 provided with a primary winding 15 having its electrical midpoint connected to one side of direct current circuit 12 and end terminals connected to the other side of direct current circuit 12 through electric valves 16 and 17. Electric valves 16 and 17 are each provided with an anode 18, a cathode 19 and a control grid 20, and may be of any of the several types well known in the art although I prefer to employ electric valves of the gaseous discharge type. A commutating capacitance 21 is connected across the anodes 18 of electric valves 16 and 17 and a smoothing reactor 22 is connected between direct current circuit 12 and primary winding 15. In order to render electric valves 16 and 17 periodically and alternately conductive, their control grids 19 are connected to opposite sides of secondary winding 23 of transformer 24. The electrical midpoint of secondary winding 23 is connected to ground and to the common cathode 19 circuit of electric valves 16 and 17 through a current limiting resistance 25 which provides a high resistance path for current flow from cathodes 19 to control grids 20. Transformer 25 is provided with a primary winding 26 which is energized from any suitable source of alternating current 27 of a frequency it is desired to supply to circuit 13.

The general principles of operation of the above described inverter will be well understood by those skilled in the art. In brief, if one of the electric valves, for example the valve 16, is initially rendered conductive, current will flow through the upper portion of secondary winding 15 and electric valve 16 inducing one half cycle of alternating current in secondary winding 28 of transformer 14. During this interval the capacitance 21 becomes charged to substantially twice the potential of the direct current of direct current source 12 and when the grid potential supplied by secondary winding 23 reverses polarity to render the valve 17 conductive, the potential of capacitance 21 is effective to commutate the current from electric valve 16 to electric valve 17. Current now flows through the lower portion of winding 15 inducing a half cycle of alternating current of opposite polarity in secondary winding 28. In this manner the current is successively commutated between electric valves 16 and 17 and an alternating current is induced in the secondary winding 28 of transformer 14.

In order to regulate the single phase voltage appearing across conductors 13a and 13b, the reactive winding 29 of a saturable reactor 30 is connected across the anodes 18 of electric valves 16 and 17. An auxiliary secondary winding 31 of transformer 14 is connected through an electric valve 32 and an electric discharge means 33 to saturating winding 34 of saturable reactor 30. Electric valve 32 is a full wave rectifier and comprises anodes 35 and 36 and a cathode 37. Electric discharge means 33, preferably of the high vacuum type, comprises an anode 38, a cathode 39, a control grid 40, a screen grid 41, and a suppressor grid 42 which is connected to cathode 39. Anode 38 is connected to control grid 40 through a resistance 44 and a capacitance 45 to prevent high frequency oscillation of electric discharge means 33. Screen grid 41 is connected to ground through resistance 46 and capacitance 47 and to cathode 37 of electric valve 32 through a current limiting resistance 48.

It can be seen now that saturable reactor 30 and commutating capacitance 21 comprises a parallel circuit. If the impedance of reactive winding 29 of saturable reactor 30 is increased, the voltage across primary winding 15 is increased. As a result, the voltage across secondary winding 28 is also increased. Conversely, if the impedance of reactive winding 29 is decreased, the voltage across secondary winding 32 is decreased. The impedance of reactive winding 29 can be controlled by varying the conductivity of electric discharge means 33. If the conductivity of electric discharge means 33 increases with an increase in the voltage across conductors 13a and 13b, the current flowing in saturating winding 34 is increased and the impedance of reactive winding 29 is decreased. This causes a decrease in the voltage across conductors 13a and 13b. On the other hand, if the conductivity of electric discharge means 33 is decreased, the impedance of reactive winding 29 is increased and the voltage across conductors 13a and 13b is increased.

The control means for varying the conductivity of electric discharge means 33 in accordance with the voltage across conductors 13a and 13b comprises a voltage sensing transformer 49 provided with a primary winding 50 connected across conductors 13a and 13b. Secondary winding 51 of transformer 49 is connected in series with the anode-cathode circuit of an electric discharge means 52. Electric discharge means 52 comprises an anode 53, a cathode 54, a suppressor grid 55 which is connected to the cathode 54, and a control grid 56 which is connected to anode 53 through a resistance 57. Electric discharge means 52 is a half wave rectifier and may be of any of the several types well known in the art although I prefer to employ an electric discharge means of the gaseous type. Connected across secondary winding 51 and electric discharge means 52 is a filter comprising condensers 58 and 59, a reactor 60 and a resistance 61. A resistance 62 and a glow discharge valve 63 which acts as a voltage regulator are also connected in series relation across secondary winding 51 and electric discharge means 52. A voltage divider comprising serially connected resistances 64, 65 and 66 is also connected across secondary winding 51 and electric discharge means 52.

A voltage control or voltage adjusting contact 67 connects resistance 65 through a current limiting resistance 68 to the control grid 69 of an electric discharge means 70 and impresses on the control grid 69 a potential which varies in accordance with the voltage of secondary winding 51 and therefore with the voltage across conductors 13a and 13b. Electric discharge means 70 is provided with an anode 71, a cathode 72, a suppressor grid 73 connected to cathode 72, and a screen grid 74 connected to cathode 72 through a resistance 75 and to cathode 54 of electric discharge means 52 through resistance 76. Electric discharge means 70 may be of any of the several types well known in the art although I prefer to employ an electric discharge means 70 of the high vacuum type. Electric discharge means 70 is connected in series relation with resistance 77 across glow discharge means 63. Anode 71 of electric discharge means 70 is connected to control grid 40 of electric discharge means 39 through a current limiting resistance 78 to impress on the control grid 40 a potential which varies in accordance with the voltage across conductors 13a and 13b.

The common juncture 79 of glow discharge means 63 and resistance 62 is connected to cathode 72 thereby maintaining its potential substantially constant. The potential of control grid 69, however, varies in accordance with the voltage across the voltage divider which comprises resistances 64, 65 and 66. Thus when the voltage across conductors 13a and 13b and across secondary winding 51 increases, a more negative potential is impressed on control grid 69 of electric discharge means 70. Electric discharge means 70 amplifies the change in potential of grid 69 and impresses a more positive potential on control grid 40 of electric discharge means 39. Electric discharge means 39, therefore, is rendered more conductive and transmits more current through saturating winding 34, the impedance of reactive winding 29 is decreased, and the voltage across conductors 13a and 13b is decreased. Conversely, when the voltage across conductors 13a and 13b is decreased, the conductivity of electric discharge means 39 is decreased and the voltage across conductors 13a and 13b is increased. The voltage across conductors 13a and 13b is thus maintained substantially constant.

The exact voltage to be maintained across conductors 13a and 13b can be set by adjusting contact 67 on resistance 65. The position of contact 67 on resistance 78 determines the bias on control grid 69 and hence the current flowing in saturating winding 34 when the desired voltage appears across conductors 13a and 13b.

Inverter 11 is an exact duplicate of inverter 10 and transmits energy between direct current circuit 12 and conductors 13b and 13c of three phase alternating current circuit 13a, 13b and 13c. Inverter 11 being an exact duplicate of inverter 10, components of inverter 11 have been provided with the reference characters of the corresponding components of inverter 10 which have been primed to facilitate identification. Inverter 11 functions in exactly the same manner as inverter 10 and the explanation of the mode of operation of inverted 10 applies to inverter 11 if each reference character referred to in the explanation be primed.

It will be well understood by those skilled in the art that if the phase positions of the voltages appearing across conductors 13a and 13b and 13b and 13c be maintained 120 electrical degrees apart, a third voltage will appear across conductors 13a and 13c which will be equal to the voltage across conductors 13a and 13b or 13b and 13c since these latter voltages are maintained constant. Furthermore, the voltage across conductors 13a and 13c varies directly in accordance with the difference in phase between the voltages appearing across conductors 13a and 13b, and 13b and 13c. If the latter voltages are less than 120 electrical degrees apart, the voltage appearing across conductors 13a and 13b is smaller than the voltages appearing across conductors 13a and 13b and conductors 13b and 13c. Conversely, if the phase positions are more than 120 electrical degrees apart, the voltage across conductors 13a and 13c will be greater than the voltages across conductors 13a and 13b and conductors 13b and 13c. By maintaining the phase positions of the voltages across conductors 13a and 13b and 13b and 13c exactly 120 electrical degrees apart, the voltage across conductors 13a and 13c will be maintained constant and equal to the voltages across conductors 13a and 13b and conductors 13b and 13c.

In order to maintain a constant voltage across conductors 13a and 13c, I provide a phase shifting circuit 79 to shift the phase of the voltage across primary winding 26' in accordance with the voltage across conductors 13a and 13c. Shifting the phase of the voltage across primary winding 26' changes the time at which electric valves 16' and 17' are alternately conductive with respect to the time at which electric valves 16 and 17 are alternately conductive and therefore shifts the phase position of the voltage appearing across conductors 13b and 13c with respect to the phase position of the voltage appearing across conductors 13a and 13b. Phase shifting circuit 79 comprises a capacitance 80 connected in series with the reactive winding 81 of a transformer 82 across conductors 13a and 13b. Primary winding 26' is connected between the common connection or juncture 83 of reactive winding 81 and capacitance 80 and the electrical midpoint 80a of secondary winding 28. In order to control the phase of the voltage across primary winding 26', a secondary winding 84 is provided on transformer 82 whose opposite sides are connected to the anodes 85 of electric discharge means 86 and 87, respectively and whose electric midpoint 88 is connected to the common connection or juncture 89 of cathodes 90 of electric discharge means 86 and 87. Electrical discharge means 86 and 87 are also provided with grids 91 and may be of any of the several types well known in the art although I prefer to utilize high vacuum electric discharge means having a high transconductance. If desired, electric discharge means 86 and 87 could be replaced by a double triode type electric discharge means contained in a single envelope. The impedance of reactive winding 81 varies accordance with the conductivity of electric discharge means 86 and 87. When the conductivity of electric discharge means 86 and 87 is high, the impedance of reactive winding 81 is low, and when the conductivity is low the impedance is high. The phase position of the voltage across secondary winding 26' is varied by varying the impedance of reactive winding 81.

In order to vary the conductivity of electric discharge means 86 and 87 in accordance with the voltage across conductors 13a and 13c, I provide a voltage sensing transformer 92 having a primary winding 93 connected across conductors 13a and 13c and a secondary winding 94 connected to the anode-cathode circuit of an electric discharge means 95. Electric discharge means 95 comprises an anode 96, a cathode 97, a screen grid 98 connected to anode 96 through a current limiting resistance 99, and a control grid 100 connected to anode 96. Electric discharge means 95 acts as a half wave rectifier and may be of any of the several types well known in the art although I prefer to utilize electric discharge means of the gaseous type.

Connected across secondary winding 94 and electric discharge means 95 is a filter which may comprise capacitances 101 and 102, a resistance 103 and a reactor 104. A voltage divider comprising a resistance 105 and glow discharge means 106 and 107 which act as voltage regulators is connected across winding 94 and electric discharge means 95. Serially connected resistances 108 and 109 are also connected across winding 94 and electric discharge means 95. A voltage control or voltage adjusting contact 110 connects resistance 108, through a current limiting resistance 111, to the control grid 112 of an electric discharge means 113 and impresses on control grid 112 a potential which varies in accordance with the voltage across secondary winding 94 and therefore with the voltage across conductors 13a and 13c. Electric discharge means 113 is provided with an anode 114, a cathode 115, a suppressor grid 116 connected to cathode 115, and a screen grid 117 connected to anode 115 through resistances 118 and 119. Capacitance 120 and resistance 121 are connected across control grid 112 and anode 114 to prevent oscillation of electric discharge means 113. Electric discharge means 113 may be of any of the several types well known in the art although I prefer to employ an electric discharge means of the high vacuum type.

Electric discharge means 113 is connected in series relation with resistance 119 across glow discharge means 106 and 107. Anode 114 is connected to control grids 91 of electric discharge means 86 and 87 to impress on control grids 91 a potential which varies in accordance with the voltage across conductors 113a and 113c. The common connection or juncture 122 of glow discharge means 106 and 107 is connected to cathodes 90 of electric discharge means 86 and 87 to maintain the potential of cathodes 90 substantially constant. The common connection or juncture 123 of glow discharge means 106 and resistance 105 is connected to cathode 115 of electric discharge means 113 in order to maintain its potential substantially constant. The potential impressed on control grid 112, however, varies with the voltage across the voltage divider which comprises resistances 108 and 109.

If we assume now that the voltages across conductors 13a and 13b, 13b and 13c, and 13a and 13c are equal, the conductors 13a, 13b and 13c constitute a three phase alternating circuit with voltages of the three phases being 120 electrical degrees apart. If the voltage across conductors 13a and 13c increases, the voltages across conductors 13a and 13b and 13b and 13c have moved more than 120 electrical degrees apart since the voltages across these pairs of conductors are maintained constant by the saturable reactors 30 and 30' and their associated controls. The increase in voltage across conductors 13a and 13c causes a greater voltage to appear across secondary winding 94 of sensing transformer 92 and more current is transmitted by electric discharge means 95. A more negative potential is therefore impressed on control grid 112 of electric discharge means 113 which causes electric discharge means 113 to become less conductive and impresses a more positive potential on control grids 91 of electric discharge means 86 and 87, the potentials impressed on cathodes 90 of electric discharge means 86 and 87, and cathode 115 of electric discharge means 113 remaining substantially constant due to the voltage regulating action of glow discharge means 106 and 107. Electric discharge means 86 and 87 therefore become more conductive and offer less resistance to the current induced in secondary winding 84. The impedance of winding 81 is decreased and the phase of the voltage across primary winding 26' is shifted to cause electric valves 16' and 17' to become alternately conductive at such times as to cause the voltage across conductors 113b and 113c to again be 120 electrical degrees apart from the voltage across conductors 113a and 113b. The voltage across conductors 13a and 13c will therefore be decreased until it again equals the voltages across conductors 13a and 13b and conductors 13b and 13c.

An important advantage of the polyphase inverter of my invention is the very accurate regulation obtained of the magnitudes and relative phase positions of the phase voltages. Variations in the voltage of direct current circuit 12 and in the three phase alternating current load, and any unbalance in the loading of the three phases of the alternating current circuit are automatically and quickly compensated by the saturable reactor voltage regulating circuits associated with inverters 10 and 11 and by phase shifting circuit 79 and its associated control circuit.

It will be apparent to those skilled in the art that changes and modifications may be made in the illustrated embodiment of my invention without departing from my invention. For example, other voltage regulating means may be employed with each inverter 10 and 11 in place of the disclosed saturable reactor regulating circuits. Also primary winding 26' may be connected to the electrical midpoint of primary winding 26 instead of to the electrical midpoint 80a as shown. However where the auxiliary source of alternating current 27 cannot deliver a sufficient amount of power, it is preferable to connect winding 26' to electrical midpoint 80a.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. An apparatus for transmitting energy from a direct current system to a polyphase alternating current system comprising a pair of single phase inverters connected in parallel between said systems, each of said invertors comprising a pair of electric valves provided with control grids and cathodes, and a grid transformer provided with a secondary winding having outer terminals connected to the control grids of the pair of valves and having its electrical midpoint connected to the cathodes of the pair of electric valves, said transformer having a primary winding adapted to be connected to a source of alternating potential of a predetermined frequency and means operatively associated with said polyphase alternating current circuit for maintaining the alternating potentials in the primary windings of said transformers differing in phase a predetermined degree to render said electric valves of said inverters successively conductive.

2. An apparatus for transmitting energy from a direct current system to a polyphase alternating current system comprising a pair of single phase inverters connected in parallel between said systems, each of said inverters comprising a pair of electric valves provided with control grids and cathodes, and a grid transformer provided with a secondary winding having outer terminals connected to the control grids of the pair of valves and having its electrical midpoint connected to the cathodes of the pair of electric valves, said transformer having a primary winding adapted to be connected to a source of alternating potential of a predetermined frequency, phase shifting means connected across a source of alternating potential providing alternating potential to the primary winding of one of said grid transformers for shifting the phase of the alternating potential in said primary winding of said one of said grid transformers and voltage sensing means operatively associated with said polyphase alternating current circuit and said phase shifting means for maintaining the alternating potentials in said primary windings of said grid transformers differing in phase a predetermined degree to render said electric valves of said inverters successively conductive.

3. An apparatus for transmitting energy from a direct current system to a polyphase alternating current system comprising a pair of single phase inverters connected in parallel between said systems, each of said inverters comprising a pair of electric valves provided with control grids and cathodes, and a grid transformer provided with a secondary winding having outer terminals connected to the control grids of the pair of valves and having its electrical midpoint connected to the cathodes of the pair of electric valves, said transformer having a primary winding adapted to be connected to a source of alternating potential of a predetermined frequency phase shifting means connected to the primary winding of one of said grid transformers and means operatively associated with said polyphase alternating current circuit and said phase shifting means for maintaining the alternating potentials in said primary winding of said grid transformers differing in phase a predetermined degree to render said electric valves of said inverters successively conductive.

4. Apparatus for transmitting energy from a direct current circuit to a two-phase alternating current circuit comprising a pair of single-phase inverters for connection in parallel between said systems, each of said inverters comprising a pair of electric valves provided with control grids and cathodes, and a grid transformer provided with a secondary winding having outer terminals connected to the control grids of the pair of electric valves and having its electrical midpoint connected to the cathodes of said pair of electric valves, said transformer having a primary winding adapted to be connected to a source of alternating potential of a predetermined frequency and means operatively associated with said two-phase alternating current circuit for maintaining the alternating potentials in the primary windings of said transformers differing in phase a predetermined degree to render said electric valves of said inverters successively conductive.

5. Apparatus for transmitting energy from a direct current circuit to a two-phase alternating current circuit comprising a pair of single-phase inverters for connection in parallel between said systems, each of said inverters comprising a pair of electric valves provided with control grids and cathodes, and a grid transformer provided with a secondary winding having outer terminals connected to the control grids of the pair of electric valves and having its electrical midpoint connected to the cathodes of said pair of electric valves, said transformer having a primary winding adapted to be connected to a source of alternating potential of a predetermined frequency, phase shifting means connected to the primary winding of one of said grid transformers and means operatively associated with said two-phase alternating current circuit and said phase shifting means for maintaining the alternating potentials in said primary windings of said grid transformers differing in phase a predetermined degree to render said electric valves of said inverters successively conductive.

6. Apparatus for transmitting energy from a direct current circuit to a two-phase alternating current circuit comprising a pair of single-phase inverters for connection in parallel between said systems, each of said inverters comprising a pair of electric valves provided with control grids and cathodes, and a grid transformer provided with a secondary winding having outer terminals connected to the control grids of the pair of electric valves and having its electrical midpoint connected to the cathodes of said pair of electric valves, said transformer having a primary winding adapted to be connected to a source of alternating potential of a predetermined frequency, phase shifting means connected across a source of alternating potential for providing alternating potential to the primary winding of one of said grid transformers and for shifting the phase of the alternating potential in said primary winding of said one of said grid transformers, voltage sensing means operatively associated with said two-phase alternating current circuit and said phase shifting means for maintaining the alternating potentials in said primary windings of said grid transformers differing in phase a predetermined degree to render said electric valves of said inverters successively conductive.

7. Apparatus for transmitting energy from a direct current circuit to a three-phase alternating current circuit comprising a pair of single phase inverters for connection in parallel between said systems, each of said inverters comprising a pair of electric valves provided with control grids and cathodes, and a grid transformer provided with a secondary winding having outer terminals connected to the control grids of the pair of electric valves and having its electrical midpoint connected to the cathodes of said pair of electric valves, said transformer having a primary winding adapted to be connected to a source of alternating potential of a predetermined frequency and means operatively associated with said three-phase alternating current circuit for maintaining the alternating potentials in the primary windings of said transformers differing in phase a predetermined degree to render said electric valves of said inverters successively conductive.

8. Apparatus for transmitting energy from a direct current circuit to a three-phase alternating current circuit comprising a pair of single phase inverters for connection in parallel between said systems, each of said inverters comprising a pair of electric valves provided with control grids and cathodes, and a grid transformer provided with a secondary winding having outer terminals connected to the control grids of the pair of electric valves and having its electrical midpoint connected to the cathodes of said pair of electric valves, said transformer having a primary winding adapted to be connected to a source of alternating potential of a predetermined frequency, phase shifting means connected to the primary winding of one of said grid transformers and means operatively associated with said three-phase alternating current circuit and said phase shifting means for maintaining the alternating potentials in said primary windings of said grid transformers differing in phase a predetermined degree to render said electric valves of said inverters successively conductive.

9. Apparatus for transmitting energy from a direct current circuit to a three-phase alternating current circuit comprising a pair of single phase inverters for connection in parallel between said system, each of said inverters comprising a pair of electric valves provided with control grids and cathodes, and a grid transformer provided with a secondary winding having outer terminals connected to the control grids of the pair of electric valves and having its electrical midpoint connected to the cathodes of said pair of electric valves, said transformer having a primary winding adapted to be connected to a source of alternating potential of a predetermined frequency, phase shifting means connected across a source of alternating potential of the predetermined frequency for providing alternating potential to the primary winding of one of said grid transformers and for shifting the phase of the alternating potential in said primary winding of said one of said grid transformers and voltage sensing means operatively associated with said three-phase alternating current circuit and said phase shifting means for maintaining the alternating potentials in said primary windings of said grid transformers differing in phase a predetermined degree to render said electric valves of said inverters successively conductive.

10. An apparatus for transmitting energy from a direct current circuit to a three-phase alternating current system comprising a pair of single phase inverters for connection between said systems, each of said inverters comprising a pair of electric valves provided with control grids, voltage regulating means operatively associated with each of said inverters to maintain the alternating current output of each of said inverters substantially constant in voltage, means for simultaneously impressing alternating potentials upon the control grids of said electric valves associated with the two inverter circuits to render said electric valves successively conductive and means responsive to the voltage of the phase of the alternating current appearing across the output circuits of said single phase inverters for maintaining the alternating potentials impressed on said control grids of said electric valves of one of said inverters differing 120 electrical degrees in phase from the alternating potentials impressed on said control grids of said electric valves of the other of said inverters.

11. An apparatus for transmitting energy from a direct current circuit to a three-phase alternating current system comprising a pair of single phase inverters for connection between said systems, each of said inverters comprising a pair of electric valves provided with control grids and means for simultaneously impressing upon the control grids of the electric valves associated with the two inverter circuits alternating potentials to render said electric valves successively conductive the alternating potential impressed on the control grids of the electric valves of one of said inverters differing substantially 120 electrical degrees in phase from the alternating potential impressed on the control grids of the electric valves of the other of said inverters.

12. In combination a direct current system, a three-phase alternating current system, a pair of single phase inverters connected in parallel between said system, voltage regulating means associated with each of said inverters for maintaining the output voltage of each of said inverters substantially constant, each of said inverters directly energizing one phase of said three-phase alternating current system, means adapted to be energized from a source of alternating current of a predetermined frequency for controlling the frequency of the alternating current output of one of said inverters, means for maintaining the frequency of the alternating current output of the other of said inverters equal to the frequency of the output of said one of said inverters and means operatively associated with said last mentioned means and responsive to the voltage of the phase of said three-phase system energized by both of said inverters for shifting the phase of the alternating current output of said other of said inverters in accordance with the voltage of the phase of said three-phase circuit energized by both of said inverters to maintain constant voltage in said last mentioned phase of said three-phase system.

13. In combination a direct current circuit, a three phase alternating current circuit, a first inverter connected between said direct current circuit and said three phase alternating current circuit for energizing a first phase of said alternating current circuit means operatively associated with said first inverter for maintaining the voltage of said first phase of said alternating current circuit constant, a second inverter connected between said direct current circuit and said alternating current circuit for energizing a second phase of said alternating current, means operatively associated with said second inverter for maintaining the voltage of said second phase of said alternating current circuit constant, a first means connected to said first inverter for controlling the frequency of the alternating current transmitted to said first phase of said alternating current circuit, a second means operatively associated with said first inverter and said second inverter for maintaining the frequency of the alternating current of said second phase equal to the frequency of the alternating current of said first phase, phase shifting means operatively associated with said second means for shifting the phase of the voltage of said second phase, voltage sensing means operatively associated with the third phase of said three-phase alternating current circuit, and means responsive to said voltage sensing means and operatively associated with said phase shifting means for shifting the phase of the alternating current output of said second phase in accordance with the voltage of said third phase to maintain the voltage of said third phase constant.

14. In combination a direct current system, a two-phase alternating current system, a pair of single phase inverters connected in parallel between said system, voltage regulating means for maintaining the output voltage of each of said inverters substantially constant, each of said inverters directly energizing one phase of said two-phase system, means adapted to be energized from a source of alternating current of a predetermined frequency for controlling the frequency of the alternating current output of one of said inverters, means for maintaining the frequency of the alternating current output of the other of said inverters equal to the frequency of the output of said one of said inverters and means operatively associated with said last mentioned means and responsive to the voltage across both phases of said two phase system for shifting the phase of the alternating current output of said other of said inverters in accordance with the voltage across both phases of said two phase system to maintain proper phase position between the voltages of the two phases of said two-phase alternating current system.

15. In combination a direct current system, a polyphase alternating current system, a pair of single-phase inverters connected in parallel between said systems, voltage regulating means for maintaining the output voltage of each of said inverters substantially constant, each of said inverters directly energizing one phase of said polyphase system, means adapted to be energized from a source of alternating current of a predetermined frequency for controlling the frequency of the alternating current output of one of said inverters, means for maintaining the frequency of the alternating current output of the other of said inverters equal to the frequency of the output of said one of said inverters and means operatively associated with said last mentioned means and responsive to the voltage across the single phase alternating current outputs of both of said inverters for shifting the phase of the alternating current output of said other of said inverters in accordance with the voltage across the single phase alternating current outputs of both of said inverters to maintain proper phase position between the phase voltages of the polyphase alternating current system.

16. An apparatus for transmitting energy from a direct current circuit to a polyphase alternating current system comprising a pair of single phase inverters connected in parallel between said systems, each of said inverters comprising a pair of electric valves provided with control grids, means for simultaneously impressing alternating potentials upon the control grids of said electric valves operatively associated with the two inverters to render said electric valves successively conductive and means responsive to the alternating voltage appearing across the output circuits of said single phase inverters for maintaining the alternating potentials impressed on said control grids of said electric valves of one of said inverters differing a predetermined degree in phase from the alternating potentials impressed on said control grids of said electric valves of the other of said inverters.

17. In combination a direct current system, a two phase alternating current system, a pair of single phase inverters connected in parallel between said systems, each of said inverters directly energizing one phase of said two phase alternating current system, means adapted to be energized from a source of alternating current of a predetermined frequency for controlling the frequency of the alternating current output of one of said inverters, means for maintaining the frequency of the alternating current output of the other of said inverters equal to the frequency of the output of said one of said inverters and means operatively associated with said last mentioned means and responsive to the voltage across the two phases of the two phase alternating current system directly energized by said inverters for shifting the phase of the alternating current output of said other of said inverters in accordance with the voltage across the two phases of the two phase alternating system to maintain proper phase position between the phase voltages of said two phase alternating current system.

DAVID JEAN SMITH.

REFERENCES CITED

The following references are of record in the file of this patent:

UNITED STATES PATENTS

| Number | Name | Date |
|---|---|---|
| 1,743,238 | Robinson | Jan. 14, 1930 |
| 1,917,453 | Martin | July 11, 1933 |